(12) United States Patent
Villani et al.

(10) Patent No.: US 7,156,369 B2
(45) Date of Patent: Jan. 2, 2007

(54) VALVE CONTROL DEVICE

(75) Inventors: Pietro Villani, Turin (IT); Leo Querio, Turin (IT)

(73) Assignee: Elbi International S.p.A, Turin (IT)

( * ) Notice: Subject to any disclaimer, the term of this patent is extended or adjusted under 35 U.S.C. 154(b) by 17 days.

(21) Appl. No.: 10/510,752

(22) PCT Filed: Apr. 3, 2003

(86) PCT No.: PCT/EP03/03490

§ 371 (c)(1),
(2), (4) Date: Oct. 12, 2004

(87) PCT Pub. No.: WO03/085298

PCT Pub. Date: Oct. 16, 2003

(65) Prior Publication Data

US 2005/0178994 A1     Aug. 18, 2005

(30) Foreign Application Priority Data

Apr. 11, 2002   (IT)   ........................... TO2002A0318

(51) Int. Cl.
*F16K 11/085* (2006.01)
(52) U.S. Cl. ....................... 251/203; 251/192; 251/301

(58) Field of Classification Search ................. 251/203
See application file for complete search history.

(56) References Cited

U.S. PATENT DOCUMENTS

| 2,134,143 | A | * | 10/1938 | Paget ........................ 454/363 |
| 4,208,884 | A |   | 6/1980  | Popham |
| 5,397,100 | A | * | 3/1995  | Miller ........................ 251/188 |
| 5,566,922 | A | * | 10/1996 | Tanaka et al. .............. 251/157 |
| 6,240,735 | B1 |   | 6/2001  | Kolson et al. |
| 6,584,790 | B1 | * | 7/2003  | Lopes ........................ 62/187 |

FOREIGN PATENT DOCUMENTS

WO      WO 01/04555 A    1/2001

* cited by examiner

Primary Examiner—J. Casimer Jacyna
(74) Attorney, Agent, or Firm—Sughrue Mion, PLLC

(57) ABSTRACT

The device (1) comprises a support structure (2) in which at least a first opening (8, 9) is defined, a shutter (13) which is mounted for piloting in that structure (2) and which is adapted to take up a least a first and a second angular position, in which it closes and opens at least partially the first opening (8, 9) of the structure (2), respectively, and an actuator device (25) which is capable of bringing about a controlled angular movement of the shutter (13) relative to the support structure (2).

6 Claims, 2 Drawing Sheets

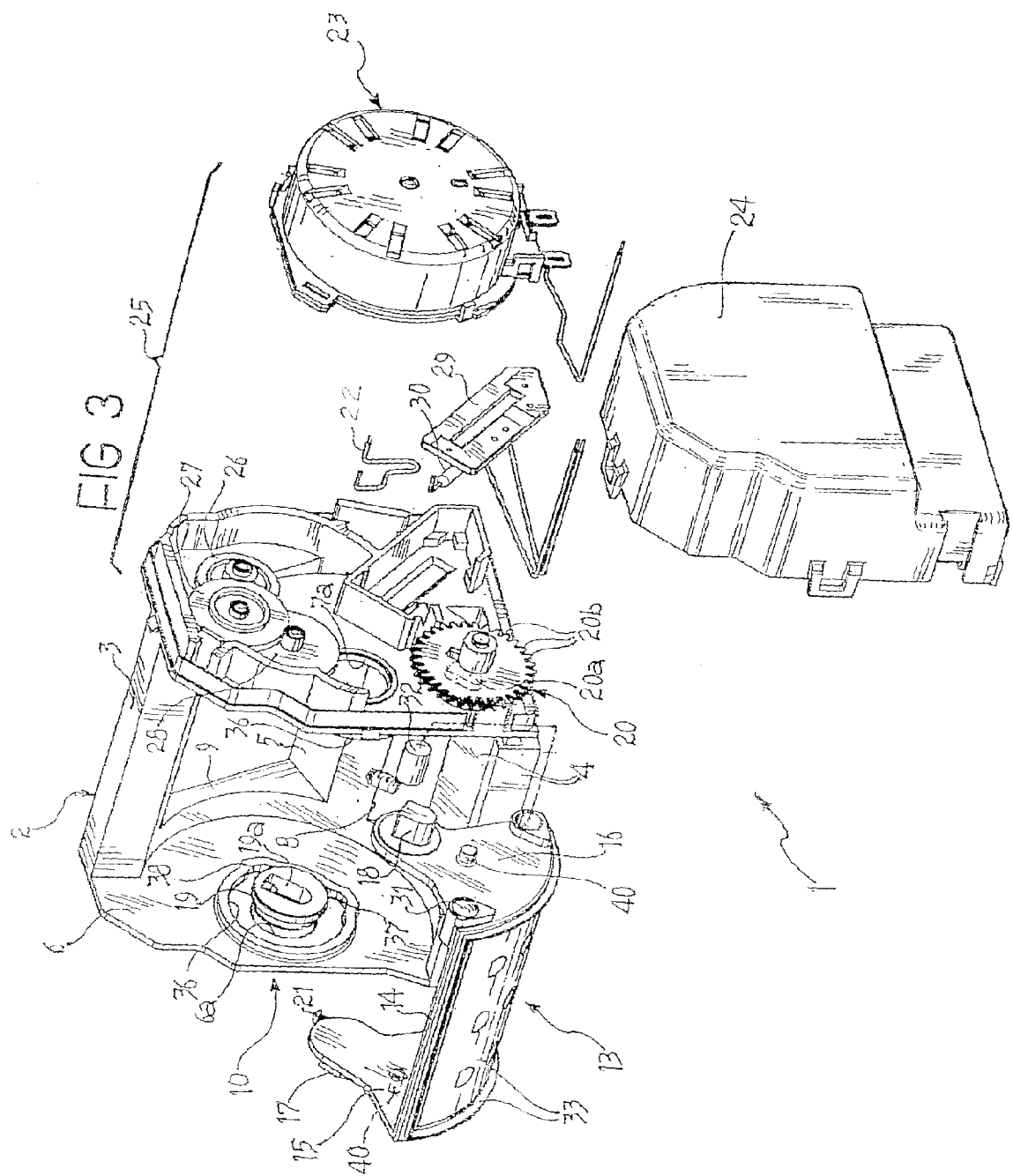

VALVE CONTROL DEVICE

This is a National Stage entry of Application No. PCT/EP03/03490 filed Apr. 3, 2003; the disclosure of which is incorporated herein by reference.

BACKGROUND OF THE INVENTION

The prevent invention relates to a valve device for the control of a flow of air in an apparatus, in particular a refrigerator, of the kind defined in the preamble of claim 1.

A valve device of that kind is disclosed in U.S. Pat. No. 4,208,884. In that prior valve device the shutter can only rotate about a fixed rotation axis within a fixed support structure.

SUMMARY OF THE INVENTION

An object of the present invention is to produce an improved valve device having a simple and economical structure and reliable operation.

BRIEF DESCRIPTION OF THE DRAWINGS

Further characteristics and advantages of the invention will become clear from the following detailed description which is given purely by way of non-limiting example with reference to the appended drawings, in which:

FIG. 3 is a perspective, partially exploded view of the valve device according to the preceding Figures.

DETAILED DESCRIPTION OF THE INVENTION

Figure 2:
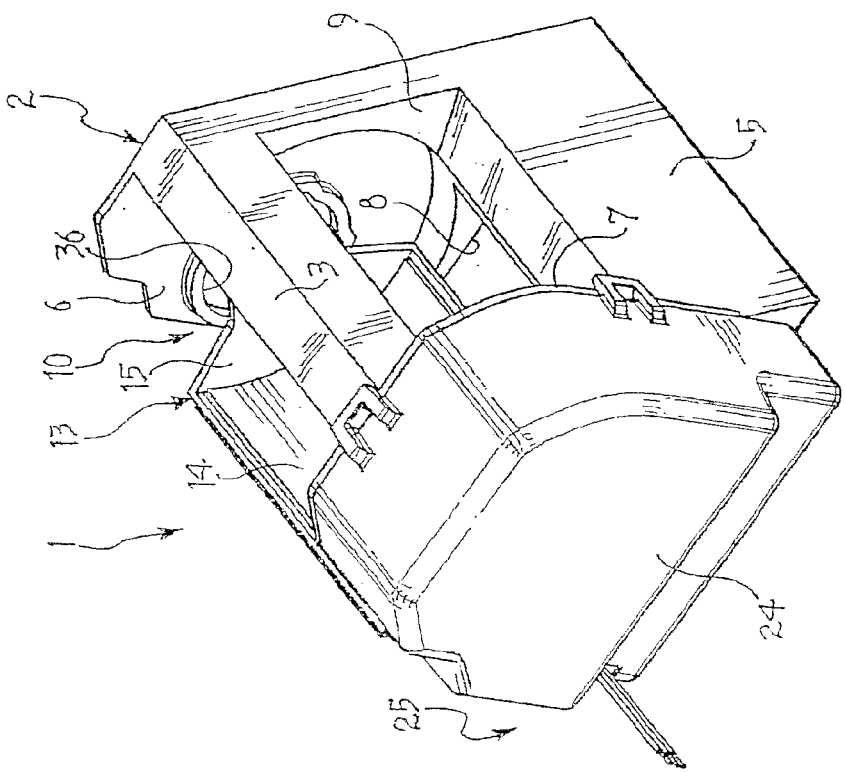
FIG. 2 is a partial perspective side/rear view of the device according to FIG. 1.

A valve device according to the invention is generally designated 1 in the drawings. This device substantially comprises a support structure 2.

As will be appreciated in particular from FIGS. 2 and 3, the support structure 2 in the embodiment illustrated has a substantially triangular cross-section, with three shaped limbs or cross-pieces 3, 4 and 5, whose ends are interconnected by two facing walls or sides 6 and 7.

A first passage or opening B is defined between the cross-pieces 4 and 5 (FIGS. 2 and 3). A second passage or opening is defined between the cross-pieces 3 and 5.

Another other opening, designated 10, is defined between the cross-pieces 3 and 4.

A shutter which is mounted for pivoting in the support structure 2 is generally indicated 13 in the drawings.

The shutter 13 has a general form which is substantially cradle-like and comprises a portion of wall 14 which is substantially cylindrical (FIG. 2), and two end walls 15 and 16 facing each other (FIG. 3). Shaped pins 17 and 18, which are axially aligned, project from the outer faces of the walls 15 and 16 of the shutter (FIG. 3). Those pins have in section an elongate form and engage with play in corresponding openings or elongate seats 19a and 20a (FIG. 3) which are constructed in bushings 19 and 20 mounted for pivoting about an axis A—A (FIG. 1), in corresponding openings 6a, 7a of the end walls 6 and 7 of the support structure. Respective helical springs 21, 22 (FIG. 3) which act transversely on the pins are associated with each of those pins 17 and 18 in the above-mentioned shaped seats 19a, 20a.

The springs 21 and 22 are arranged in such a manner that they tend to keep the pins 17 and 18 of the shutter 13 aligned along a predetermined axis relative to the support structure 2. However, the springs can allow transverse translation of the pins 17 and 18, and therefore of the shutter 13, in such a manner that the shutter can move radially away from the openings 8 and 9, as will be described in greater detail below.

The bushing 20 has a peripheral crown of teeth 20b, by means of which the bushing 20 is coupled to an actuator device 25 which can bring about an angular movement of the shutter 13 relative to the support structure 2.

The actuator device 25 comprises a hollow casing 24 which is externally coupled to the lateral wall 7 of the support structure 2 and which encloses an electric motor 23 and an associated reduction gear unit which comprises a plurality of gears 26, 27, 28, the last of which gears is coupled to the tooth arrangement 20b of the bushing 20 and thereby to the pin 18 of the shutter 13 (FIG. 3).

There is further mounted in the casing 24 a circuit board 29 which carries a position sensor 30, such as a Hall effect sensor, which can detect micromagnets 31 and 32 which are fixed to one end of the shutter 13 (FIG. 3) in angularly spaced positions.

Figure 1:
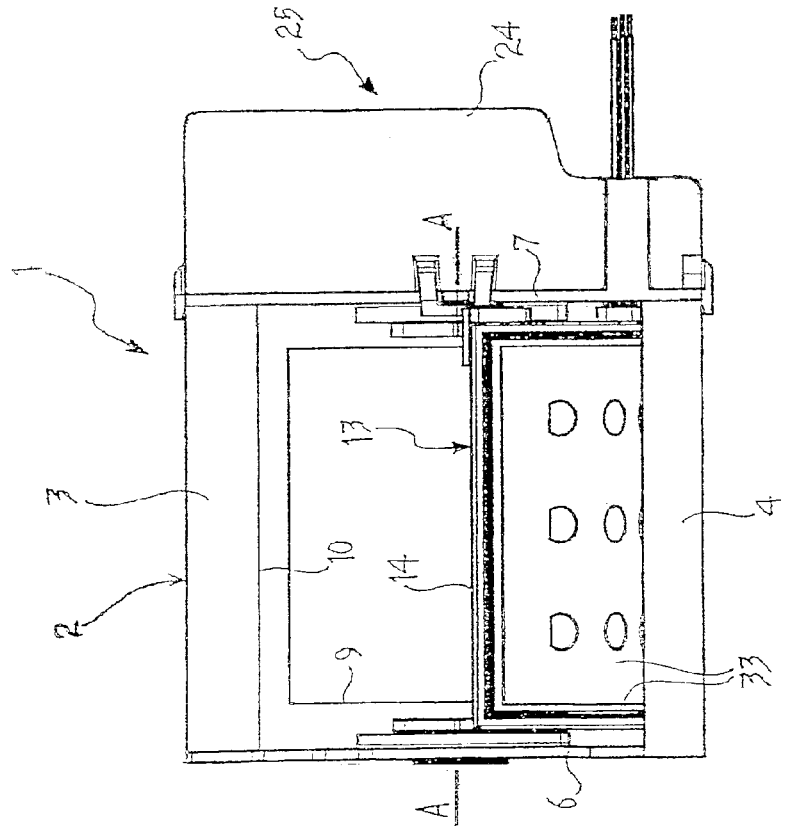
FIG. 1 is a front view of a valve device according to the invention.

A seal, like that designated 33 in FIGS. 1 and 3, can advantageously be fixed to the convex face of the cylindrical portion 14 of the shutter 13.

The shutter 13 is able to pivot in the support structure 2 and can take up a first angular position, in which it closes the opening or passage 8. In this position of the shutter 13, communication is enabled between the opening or passage 9 and the opening or passage 10 of the support structure 2.

The shutter 13 can take up a different angular position, in which it closes the opening or passage 9, and opens the opening or passage 8, allowing communication between the opening or passage 8 and the opening or passage 10.

The valve device 1 can be used, for example, to control flows of air between different regions or compartments of a refrigerator: for example, the opening or passage 8 can be permanently in communication with the freezer compartment, the opening or passage 9 can be in communication with the upper portion of the refrigerator compartment, and the opening or passage 10 can be in communication with the lower portion of the refrigerator compartment.

As will now be described, control means are associated with the shutter 13 and can bring about the movement thereof towards the openings or passages 8 and 9 when the shutter is located in the first and second above-defined angular positions, respectively, as well as the movement thereof away from those openings 8 and 9 when the pivoting shutter 13 leaves the first and second angular positions.

In the embodiment illustrated, those control means comprise an annular cam member 36 (FIGS. 2 and 3) which is constructed on an end wall or side 6 or 7 of the support structure 2, and preferably on both of the end walls 6 and 7.

Respective sensor members 40 (again visible in FIGS. 2 and 3) are associated with the outer faces of the end walls 15 and 16 of the shutter 13, for example, in the form of fixed or pivoting pegs, which can slide on the associated internal profiles of the cam type members 36.

The internal profiles of the cam type members 36 have radial recesses 37 and 38 (FIG. 3), in which the sensor members 40 of the shutter 13 can engage when the shutter 13 reaches the first and second angular positions respectively. The engagement of the sensor members 40 in those recesses is facilitated by the resilient thrusting action applied by the springs 21 and 22 on the pins 17 and 18.

The arrangement described is such that, when the shutter 13 is located in one of the above-mentioned first and second angular positions, the shutter 13 presses by means of its own seal 33 on the opening 8 or 9 of the support structure 2.

When the shutter 13 leaves one of those positions, the associated sensor members 40 move up the ramps which laterally delimit the recesses 37 or 38 of the cam profiles 36, and move onto the radially innermost profile of the cam members, counter to the action of the springs 21 and 22. This movement leads to the movement of the cylindrical portion 14 of the shutter 13, and the associated seal 33; away from the support structure 2 and the openings or passages 8 and 9. The pivoting of the shutter from one to the other of the two above angular work positions can therefore occur with substantially reduced friction.

The actuator device 25 can be produced and/or controlled so as to bring about pivoting of the shutter 13 selectively in opposite directions, or in a single predetermined direction.

In a variant which is not illustrated, another support structure can be arranged alongside the support structure 2 described above, at the side remote from the actuator device 25. Another shutter can be mounted for pivoting in the additional support structure, which shutter is similar to the one described above and is rigidly connected to the first shutter so as to be able to be caused to pivot by the same end actuator device 25. The shutter associated with the additional section of the support structure can be arranged angularly in the same position as the shutter associated with the section of the support structure adjacent to the actuator device 25, or it can be angularly offset relative thereto, as necessary.

Naturally, the principle of the invention remaining the same, the forms of embodiment and details of construction may be varied widely with respect to those described and illustrated, which have been given purely by way of non-limiting example, without thereby departing from the scope of the invention as defined in the appended claims.

What is claimed is:

1. A valve device (1) for the control of a flow of air, in particular for a refrigerator, comprising
    a support structure (2) in which at least a first opening (8, 9) is defined,
    a shutter (13) which is mounted for pivoting in that structure (2) and which is adapted to take up at least a first and a second angular position, in which it closes and opens at least partially the first opening (8, 9) of the structure (2), respectively, and
    an actuator device (25) which is capable of bringing about an angular movement of the shutter (13) relative to the support structure (2);
    the valve device (1) being characterized in that the shutter (13) is mounted in the support structure (2) so as to be translatable away from and towards the said first opening (8) and control means (36; 40; 21, 22) are associated with the shutter (13) and are capable of bringing about the movement thereof towards the first opening (8) when the shutter (13) reaches the above-mentioned first angular position, respectively, and the movement thereof away from said opening (8) when the pivoting shutter (13) leaves the said first angular position,
    wherein a first and a second opening (8, 9) are defined in the support structure (2) angularly spaced apart from each other about an axis (A—A) and the shutter (13) is mounted for pivoting substantially about that axis (A—A) and is adapted to take up a first and a second angular position in which it closes the first and second openings (8, 9) of the structure (2), respectively, and
    wherein the support structure (2) has at least a third opening (10) with angular spacing relative to the first and second openings (8, 9) in such a manner that, when the shutter (13) takes up the first and second angular positions, respectively, communication is enabled between the second opening (9) and the third opening (10) and between the first opening (8) and the third opening (10), respectively.

2. A device according to claim 1, wherein the shutter (13) is mounted in the support structure (2) so as to be translatable away from and towards the first opening (8) and second opening (9), and control means (36; 40; 21, 22) are associated with the shutter (13) and are capable of bringing about the movement thereof towards the first and second openings (8, 9) when the shutter (13) reaches the above-mentioned first and second positions, respectively, and the movement thereof away from those openings (8, 9) when the pivoting shutter (13) leaves the first and second positions, respectively.

3. A device according to claim 2, wherein the control means comprise at least one cam type member (36) having a control profile, on which a fixed or pivoting sensor member (40) of the shutter (13) is able to slide.

4. A device according to claim 2, wherein the shutter (13) has a pair of opposing pins (17, 18) which engage in respective openings or seats (19a; 20a) nepof support members (19, 20) mounted for pivoting in the structure (2) about the axis (A—A), and wherein the control means comprise resilient means (21, 22) which are associated with those pins (17, 18) and which tend to urge the shutter (13) radially towards the exterior.

5. A device according to claim 3, wherein the cam profile (36) has a first and a second recess (37, 38), in which the at least one sensor member (40) of the shutter (13) is adapted to engage when the shutter (13) is located in the first and second angular positions, respectively.

6. A device according to claim 4, wherein the resilient means (21, 22) comprise, for each pin (17, 18) of the shutter (13), a spring (21, 22) which is housed in the corresponding seat (19a, 20a) of the associated pivoting support member (19, 20) and which acts on the pin (17, 18) in a transverse direction relative to the axis (A—A).

* * * * *